3,476,585
PROCESS OF FORMING COATED
WOOD PRODUCTS
Richard S. Fraser and Paul Y. Jone, Seattle, Wash., assignors to Weyerhaeuser Company, Tacoma, Wash., a corporation of Washington
No Drawing. Filed Oct. 17, 1966, Ser. No. 586,935
Int. Cl. B44d 1/14, 1/28, 1/26
U.S. Cl. 117—71                              9 Claims

ABSTRACT OF THE DISCLOSURE

Metal or metallic oxide coatings are more effectively bonded to wood substrates such as plywood, lumber, particleboard, etc. by applying a resin mixture of phenolformaldehyde and the reaction product of a polyamide prepolymer reacted with epichlorohydrin to the surface of the wood substrate, drying and/or curing the resin coating, and depositing a metal or metallic oxide on the resin coated substrate by the spray metal technique. Ceramic materials or cermets may be applied over the surface of the spray metal particles.

---

This invention relates to a process for forming coated wood products with metal and ceramic material. More specifically, this invention relates to the process for forming coated wood products with metal and ceramic in such a manner as to effectively increase the bond strength between the metal and wood substrate by employing a mixture of phenolic and epichlorohydrin resins.

The process of depositing sprayed metal coatings upon wood substrates is well known in the metallizing art. It is also known in the metallizing art that it is difficult to achieve a strong and lasting bond of the metal to the wood fibers. In order to overcome this difficulty, various substances have been applied to the substrate which form an adhesive film to achieve a stronger bond therebetween. Specifically, various combinations of rubber cement and phenolic resins are the most used substances, although it is also known that phenolic and other resins when applied to the porous coating after spraying for the purpose of sealing the coating also have the beneficial effect of increasing the bond strength of the metal to the wood. These methods of achieving a stronger bond between the wood and metal have not been notably successful because they are based on the principle of forming a continuous film which tends to prevent intimate contact between the metal deposit and the substrate.

The object of this invention is to provide a method of treating a wood surface with a mixture of phenol formaldehyde and epichlorohydrin polyamide resin which coats the wood fiber on its outer surface of the wood but does not form a continuous film thereon.

Another object of this invention is to provide a method of applying spray metal particles on a wood substrate which increases the efficiency of the deposition of the metal particles to the wood.

It has been discovered that a hard, high melting point metal material may be effectively bonded to a wood substrate using the spray metal technique by first applying to the wood substrate a resinous composition which does not provide a continuous film on the wood surface but coats the wood fiber thereon. The resinous component that is applied to the wood substrate is preferably a mixture consisting of a first component of a phenol formaldehyde resin which is soluble in alcohol or mixed organic solvents and a second component which consists essentially of a water soluble reaction product, a polyamide prepolymer reacted epichlorohydrin.

In the preferred form, the phenol formaldehyde resin component is formulated by first admixing together formaldehyde and phenol at a molecular ratio of from 1.2 to 2 moles of formaldehyde per mole of phenol and enough water to provide about 80% solids content into a reaction chamber and then heating to about 90° C. Thereafter, up to about 3 parts by weight of a 50% sodium hydroxide solution are added over a period of about 2 hrs. and the reaction continued at 90° C. for a total of about 2 to 4 hrs. The reaction mixture is then cooled to about between 50 and 60° C. and dehydrated under vacuum. The reaction mixture is then further cooled and between 1 and 7 parts by weight of toluene and between 3 and 10 parts of isopropyl alcohol and between 3 and 10 parts by weight of methyl alcohol are added. The final product has a solids content of up to about 65% and a viscosity of between 10 and 500 centipoise.

The second component of the resinous material may take the form of the resin described in U.S. Patent No. 3,224,990, wherein a polyamide epichlorohydrin resin reaction product is prepared by reacting diethylene triamine and adipic acid at about 160 to 200° C. The water is removed by distillation. The reaction mixture is cooled slowly and water is added slowly until the temperature reaches below 150° C. Then, water is added to the prepolymer along with ammonium hydroxide and epichlorohydrin and heated to 70° C. The pH may be adjusted to about 8.1 with caustic soda and the reaction continued until a viscosity of between 40 and 100 centipoise is reached. Formic acid can be added to obtain a pH of about 3.5 and the reaction mixture cooled to room temperature. The final resin had a solids content of approximately 25%.

The final resin formulation can be prepared by first diluting the phenol formaldehyde component with a solvent carrier. The solvent carier may comprise a mixture of methyl ethyl ketone, water and isopropyl alcohol. The ratio of water to methyl ethyl ketone may range between 0.5 to 2 parts of water per part of methyl ethyl ketone while the ratio between isopropyl alcohol and methyl ethyl ketone may range between 1.5 and 7. Then the polyamide epichlorohydrin second component is slowly admixed with the phenol formaldehyde and solvent carrier. In the event that during the addition of the polyamide epichlorohydrin resin component the final mixture becomes cloudy, additional solvent is merely added to provide stability of the final resin. The final mixture contains up to aproximately 18% resin solids. The ratio between the phenol formaldehyde component and the polyamide epichlorohydrin component of the resin solids may vary over a wide range preferably being between 3:1 to 6:1 but preferably being 4.5:1. The solvent composition and mixing procedures may be varied to obtain stable mixtures as desired. It should be noted that the final mixture of the resinous component must have a viscosity of less than about 200 centipoise, preferably about less than 50 centipoise to obtain the results desired. In the event that the viscosity is higher, a continuous film is formed on the wood substrate and the purpose of the invention is defeated. It is the purpose of the resinous component to effectively coat the fibrous material upon the surface of the wood substrate rather than to continuously coat it.

The resinous mixture material may then be applied to a wood substrate in an amount between 1 and 20 grams per sq. ft. of wood substrate treated. Thereafter, the resinous component may then be cured in an oven or preferably is left in an uncured condition but should be dried. Then, metal may be deposited upon the wood substrate by the spray metal technique. Metals employed with the present invention may be bronze, steel, aluminum, copper, nickel, chromium, or zinc. In the event that the resinous mixture has not been previously cured, the heat of the metal being deposited upon the substrate is sufficient to fully cure the resinous mixture and effectively bond the high melting point metal material to the substrate. In the event that the resinous material has been previously cured, the resinous material will sufficiently soften to allow the spray metal particles to effectively be adhered to the substrate since the resinous mixture is thermoplastic in nature but can be cured to a hard and stable material.

The finished product may now be employed as a flooring material, siding material, or other abrasive-resistant product as desired. However, in some instances it is desirable to apply a ceramic or cermet coating to the surface of the spray metal particles which may be powders of aluminum oxide and nickel aluminide or zirconium oxide which may be applied through an oxyacetylene flame process.

The wood substrates that may be coated in accordance with the present invention may be any wood material such as particleboard, hardboard, medium density fiberboard, molded fiberboard, plywood or lumber.

In order to illustrate the merits of this invention, the following examples are provided:

Example I

A phenol formaldehyde resin was prepared in the following manner: 391 parts of phenol, 374.3 parts of 50% formaldehyde and 41.5 parts of water were charged into a resin reactor and heated to 90° C. Slowly, 13.8 parts of 50% solution of sodium hydroxide were added over a period of about 50 min. and the reaction continued at 90° C. for a total of 2 hrs. The reaction mixture was then cooled to 55° C. and dehydrated under vacuum until a refractive index of 1.58 was reached. The reaction mixture was then cooled to 35° C. and 23.8 parts of toluene, 77.8 parts of isopropyl alcohol and 77.8 parts of methyl alcohol were added. The final product had a solids content of approximately 65% and a viscosity of about 200 centipoise. A polyamide epichlorohydrin resin was then formulated in the following manner: a polyamide prepolymer was prepared by reacting 262.9 parts of diethylene triamine and 372.5 parts of adipic acid at 160° C. to 200° C. Water was removed by distillation until about 9.7% of the original charge had been collected. The mixture was cooled slowly and 364.6 parts of water were added slowly until the temperature reached 150° C. Then 208.1 parts of the above prepolymer and 625 parts of water, 17.9 parts of 28% ammonium hydroxide and 136.3 parts of epichlorohydrin were added and the mixture heated to 70° C. The pH was adjusted to 8.1 with caustic soda and the reaction continued at 70° C. until a viscosity of 80 centipoise was reached. Formic acid was then added to a pH of 3.5 and the reaction mixture was cooled to room temperature. The final solids content was approximately 25%. The phenol formaldehyde and polyamide epichlorohydrin components were then mixed together employing 100 parts of the phenol formaldehyde component which was diluted with 60 parts of isopropyl alcohol and 30 parts of polyamide epichlorohydrin component. Fifty parts of a 50:50 isopropyl alcohol water mixture were added followed by 14 parts of methyl ethyl ketone and another 30 parts of the polyamide epichlorohydrin resin. In successive steps 25 parts of isopropyl alcohol mixture, 74 parts of isopropyl alcohol, 40 parts of the isopropyl alcohol mixture and 14 parts of methyl ethyl ketone were added. The final mixture contained approximately 18% resin solids.

Example II

Samples of Douglas fir lumber, Douglas fir plywood, and urea formaldehyde bonded particleboard were prepared for metal spray with the following substrate treatments:

(1) No treatment (control);

(2) Phenol formaldehyde resin of Example I was diluted with isopropyl alcohol to a viscosity of about 50 centipoise and applied in an amount of 7 grams per sq. ft.;

(3) Epichlorohydrin polyamide resin of Example I was diluted with isopropyl alcohol to a viscosity of 50 centipoise and applied in an amount of 7 grams per sq. ft.;

(4) A mixture of phenol formaldehyde polyamide epichlorohydrin resin as set forth in Example I having a ratio of 4.5:1 of phenol formaldehyde to polyamide epichlorohydrin having a viscosity of 50 centipoise and applied in an amout of 7 grams per sq. ft.

All samples were sprayed with covering coats of aluminum and zinc using the spray metal technique. The plywood samples were sprayed at three different stages of cure, i.e., uncured, partially cured, fully cured. The other samples were sprayed with resins fully cured only. The samples were tested for bond strength in accordance with TAPPI procedures T459–48. All resin treatments showed higher test values than the untreated controls. The resinous mixture of the fourth treatment showed greater consistency at all stages of the cure and generally higher values and higher percentages of wood failure.

Example III

The samples as formed in Example II were subjected to 17 cycles of boil-dry tests in accordance with the American Plywood Association Coating Handbook. The results show that the fourth resin treatment demonstrated superior qualities of maintaining adhesion and resisting cracks and blisters when compared to controls and to the individual phenol formaldehyde and polyamide epichlorohydrin resins on the substrates.

Example IV

Three-inch by six-inch samples of Douglas fir plywood were treated with the resin as outlined in Example I. All were sprayed with a covering coat of aluminum. Subsequently, the following coatings were applied to the metal sprayed surface:

(1) Another coat of polyamide epichlorohydrin phenol formaldehyde resin in an amount of 7 grams per sq. ft.;

(2) An acrylic lacquer;

(3) An epoxidized alkyd paint;

(4) A polyurethane coating;

(5) An epoxy resin.

These samples were then subjected to several cycles of preliminary boil test. These composite coatings all displayed bond strength superior to either coating used alone.

Example V

One-half of a 10" length of cedar siding was coated with the resin as set forth in Example I. Aluminum was then sprayed over the entire surface. Subsequently a thermo-spray gun was loaded with aluminum oxide powder and the molten product of this process applied to the aluminum surface. On the entire one-half section which was not coated with the resinous component the whole aluminum coating fell off. However, the one-half section which had been coated with aluminum oxide was successfully deposited in a thin coating and the aluminum remained bonded to the substrate.

Example VI

A resin as set forth in Example I was applied by brushing to the surface of dry hemlock siding and allowed to soak into the surface. Excess resin was removed with a clean cloth. The surface was redried with hot air. The siding thus primed was then flame sprayed with a coating of aluminum oxide of about .007" thick. Portions were then painted with an exterior house paint and placed on a southern-exposure weathering rack. Other samples uncoated with the resin of Example I were prepared as controls with the same coating of aluminum and exterior paint. After five months' continuous exposure, the control samples, whether with or without exterior paint, showed severe cracking, flaking, and delamination of the entire coating. Those treated with the resinous subprimer, both painted and unpainted, showed the bond to be still intact. In fact, there were no apparent defects whatever in some instances.

Example VII

Two samples of particleboard were prepared. One sample was first treated with a primer of a phenol formaldehyde polyamide epichlorohydrin resinous mixture in accordance with Example I applied in an amount of 7 grams per sq. ft. of surface treated. The resin was allowed to air dry and then aluminum was sprayed over the entire treated surface area employing the spray metal technique. A second sample was prepared by merely spraying the entire surface area with aluminum but without the previous pretreatment with a primer. Standard adhesion tests were conducted on both samples. The first sample with the resin primer and aluminum failed at 258 p.s.i. while the second sample with aluminum only failed at 69 p.s.i. A third sample of particleboard was prepared similarly as the first sample but with a second coat of the resin in acocrdance with Example I added to the surface of the aluminum metal deposit. Standard adhesion tests indicated failure at 226 p.s.i.

What is claimed is:

1. A method of applying a metallic coating to a wood substrate comprising
    applying a resin mixture of phenol formaldehyde and the reaction product of a polyamide prepolymer and epichlorohydrin to the wood substrate, the weight ratio of phenol formaldehyde to the reaction product ranging between 3 to 1 to 6 to 1 and the viscosity of the resin mixture being less than 200 centipoises; drying the resin mixture on the wood substrate; and depositing a metallic coating on the treated wood substrate.

2. The method of claim 1 wherein between 1 to 20 grams per square foot of the resin mixture is applied to the wood substrate.

3. The method of claim 1 wherein the metallic coating is selected from the group consisting of bronze, steel, aluminum, copper, nickel and zinc.

4. The method of claim 1 including curing the resin mixture on the wood substrate prior to deposition of the metallic coating.

5. The method of claim 1 including applying a ceramic material over the metallic coating on the wood substrate.

6. The method of claim 1 including applying a cermet material over the metallic coating on the wood substrate.

7. A coated wood product comprising a wood substrate having a coating of a metal or metallic oxide on the surface thereof, the coating being bonded to the wood substrate with a resin mixture of phenol formaldehyde and the reaction product of a polyamide prepolymer and epichlorohydrin, the weight ratio of phenol formaldehyde to the reaction product ranging between 3 to 1 to 6 to 1.

8. The product of claim 7 wherein the coating is a metal selected from the group consisting of bronze, steel, aluminum, copper, nickel and zinc.

9. The product of claim 7 wherein the coating includes a ceramic material over the metallic coating.

References Cited
UNITED STATES PATENTS

| | | | |
|---|---|---|---|
| 2,157,456 | 5/1939 | Koyemann | 117—151 X |
| 2,330,333 | 9/1943 | Brubaker | 117—105.2 |
| 2,629,907 | 3/1953 | Hugger | 117—71 XR |
| 3,012,906 | 12/1961 | Anspon | 117—72 X |
| 3,085,895 | 4/1963 | Gutman | 117—72 X |

ALFRED L. LEAVITT, Primary Examiner

C. K. WEIFFENBACH, Assistant Examiner

U.S. Cl. X.R.

117—57, 72, 148, 151